UNITED STATES PATENT OFFICE

IVAN GUBELMANN, OF SOUTH MILWAUKEE, AND ARTHUR R. MURPHY, OF MILWAUKEE, WISCONSIN, ASSIGNORS, BY MESNE ASSIGNMENTS, TO E. I. DU PONT DE NEMOURS & COMPANY, A CORPORATION OF DELAWARE

TRISAZO DYESTUFF AND PROCESS OF PREPARING THE SAME

No Drawing.    Application filed July 6, 1931. Serial No. 549,094.

This invention relates to azo dyestuffs.

It is an object of this invention to produce azo dyestuffs producing on cotton blue shades, of superior fastness to light and to washing, and of good solubility.

We have found that dyestuffs satisfying these qualifications may be obtained by diazotizing an aryl-amine of the benzene or naphthalene series and coupling the same to a dialkoxy-aniline having the position para to the amino group free, rediazotizing and coupling to Cleve's acid or to another dialkoxy-aniline molecule having a free para position, rediazotizing and finally coupling to a 2-amino-5-naphthol-7-sulfonic acid compound. If desired, the sequence of the second and third components may be interchanged.

Our novel dyestuffs have the general formula:

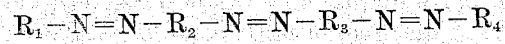

$$R_1-N=N-R_2-N=N-R_3-N=N-R_4$$

wherein $R_1$ is an aryl radical of the benzene or naphthalene series, preferably containing one or more sulfonic acid groups, and optionally containing other substituents, such as alkyl, halogen, hydroxy, alkoxy groups and the like; at least one of the groups $R_2$ and $R_3$ is a dialkoxy-aniline radical having a free para position while the other one is a Cleve's acid radical or another dialkoxy-aniline radical of the type above defined; and wherein $R_4$ stands for a 2-amino-5-naphthol-7-sulfonic acid compound, such as 2-amino-5-naphthol-7-sulfonic acid itself or its N-alkyl, aryl, aralkyl, acidyl or azole derivatives.

Our novel dyestuffs dye cotton directly in blue shades of excellent fastness to light. They also dye silk and regenerated cellulose fibers. The shades obtained by our novel dyestuffs on cotton or silk are considerably greener than those obtainable by the analogous trisazo dyestuffs having as second or third component an α-naphthylamine residue in lieu of our dimethoxy-aniline residue. This effect is rather surprising, in view of the fact that most aniline derivatives, such as aniline, o-toludine, p-xylidine, or cresidine, when used as middle components in trisazo dyestuffs of the above type, give shades more toward the violet than the α-naphthylamine residues.

The following examples will serve further to illustrate our invention, but it should be understood that the same are merely illustrative, not limitative. The parts given are parts by weight.

Example 1

273 parts of the monosodium salt of aniline-2,5-disulfonic acid, dissolved in 3000 parts of water, and cooled to 5° C., are diazotized with 348 parts of hydrochloric acid (20° Bé.) and 69 parts of sodium nitrite. To the resulting diazo solution are added 245 parts of 1,7-Cleve's acid (sodium salt), dissolved in 4,500 parts of water. The mixture is neutralized with 280 parts of sodium acetate crystals and stirred until coupling is completed. The amino-azo body thus obtained is diazotized by the addition of 348 parts of hydrochloric acid (20° Bé.) and 69 parts of sodium nitrite. To this mixture are added 189.5 parts of 2,5-dimethoxy-aniline-hydrochloride, dissolved in 4,000 parts of water, and the mixture is stirred until coupling is completed. The amino-disazo body is now further diazotized by adding 60 parts of hydrochloric acid (20° Bé.) and 69 parts of sodium nitrite. The diazo-disazo mass is now added to 315 parts of 2-phenylamino-5-naphthol-7-sulfonic acid dissolved in a miture of 5000 parts of water, and 738 parts of an aqueous ammonia solution containing 250 grams ammonia per liter. After the formation of the dyestuff, the mixture is heated to 85° C.; 1,600 parts of common salt (NaCl) are added to salt out the dyestuff, and the latter is filtered off and dried.

The dyestuff thus produced dyes cotton a greenish blue shade; it dissolves in water to give a blue solution, and in concentrated sulfuric acid to give a deep navy blue solution.

In the form of its free acid it corresponds most probably to the following formula:

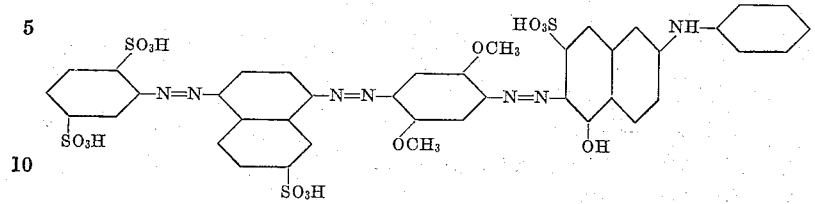

Example 2

325 parts of the monosodium salt of 2-naphthylamine-4,8-disulfonic acid are dissolved in 5000 parts of water, and 348 parts of hydrochloric acid (20° Bé.) are added. The mixture is cooled to 5° C., and diazotized with 69 parts of sodium nitrite. To the diazo mixture thus obtained there is added 160 parts of 2,5-dimethoxy-aniline dissolved in 3000 parts of water and 174 parts of hydrochloric acid (20° Bé.). The mass is stirred until coupling is completed; heated to 80° C.; and salted out with 1275 parts of common salt. The precipitated amino-azo compound is filtered off, pasted up with 10000 parts of water, and dissolved with 40 parts of caustic soda. 69 parts of sodium nitrite are now added and diazotization effected by the rapid addition of 464 parts of hydrochloric acid (20° Bé.). The mass is stirred until diazotization is complete; the insoluble diazo-azo body is filtered off, and pasted up with 8000 parts of ice and water. To the suspension thus obtained a solution of 245 parts of mixed Cleve's acid (sodium salt), dissolved in 2000 parts of water is now added, and the mixture is stirred until coupling is complete. The resulting mixture is made slightly alkaline with 53 parts of soda ash; 69 parts of sodium nitrite are added, and diazotization is effected by the rapid addition of 348 parts of hydrochloric acid (20° Bé.). The mass is now stirred until diazotization is complete and added to a solution of 239 parts of 2-amino-5-naphthol-7-sulfonic acid dissolved in 4000 parts of water containing 40 parts of caustic soda and 212 parts of soda ash. The finished coupling mass is now heated to 90° C., salted out with 2550 parts of common salt, filtered off and dried.

The dyestuff thus produced dyes cotton navy blue shades and is soluble in concentrated sulfuric acid to a deep greenish blue. In the form of its free acid, it corresponds most probably to the following formula:

Example 3

273 parts of the monosodium salt of aniline-2,5-disulfonic acid are dissolved in 3000 parts of water, and 348 parts of hydrochloric acid (20° Bé.) are added. The mixture is cooled to 5° C., and diazotized by the addition of 69 parts of sodium nitrite. 190 parts of 2,5-dimethoxy-aniline-hydrochloride are dissolved in 3000 parts of water; added to the above diazo mixture; and stirred until the formation of the monoazo compound is completed. The coupling mass is heated to 85° C., 1000 parts of common salt are added, and the amino-azo body is filtered off, and dissolved in 2000 parts of water containing 40 parts of sodium hydroxide. 69 parts of sodium nitrite are now added and diazotization effected by the rapid addition of 348 parts of hydrochloric acid (20° Bé.), and stirring until diazotization is complete. 190 parts of 2,5-dimethoxy-aniline-hydrochloride are dissolved in 4000 parts of water, and added to the above diazo mixture; the mass is neutralized with 280 parts of sodium acetate (crystals), and stirred until coupling is complete. The insoluble amino-disazo body is filtered off; dissolved in 15000 parts of water containing 40 parts of caustic soda, and diazotized by the addition of 69 parts of sodium nitrite and 464 parts of hydrochloric acid (20° Bé.). The mass is stirred until diazotization is complete, added to a mixture of 315 parts of 2-phenylamino-5-naphthol-7-sulfonic acid, in 5000 parts of water, 40 parts of caustic soda, and 240 parts of aqueous $NH_4OH$ (25% $NH_3$), and stirred until coupling is complete. The dyestuff is isolated by heating to 80° C., salting out with 2000 parts of common salt, filtering and drying.

This product dyes cotton a grayish-blue shade and is soluble in concentrated $H_2SO_4$ to a deep navy blue color. In the form of

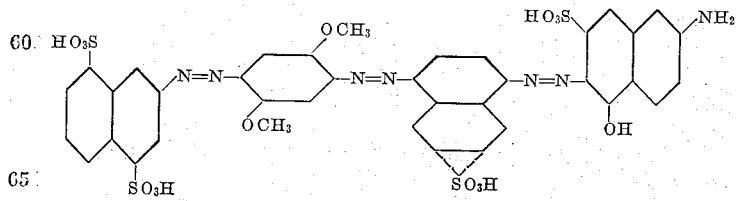

its free acid, it corresponds most probably to the following formula:

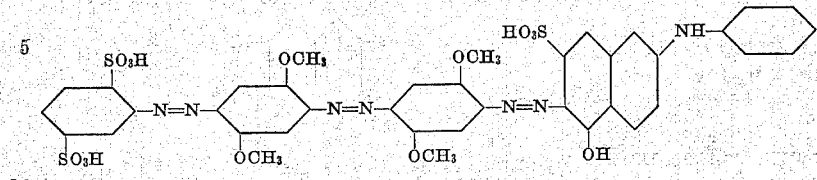

Example 4

If instead of coupling the diazo-disazo body mentioned in Example 1 to 2-phenyl-amino-5-naphthol-7-sulfonic acid, it is coupled to 239 parts of 2-amino-5-naphthol-7-sulfonic acid dissolved in 1000 parts of sodium carbonate and 5000 parts of water, one obtains, upon isolation, a dyestuff similar to that in Example 1, but dyeing cotton a redder shade of blue. This product is soluble in concentrated sulfuric acid to a reddish blue solution. In the form of its free acid it corresponds most probably to the following formula:

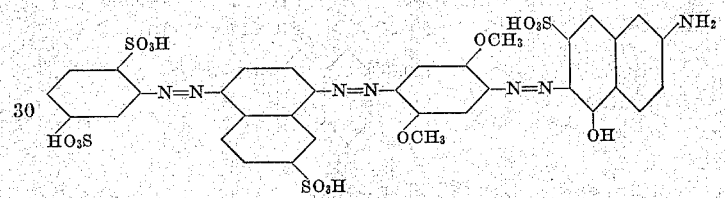

Example 5

If instead of coupling the diazo-disazo body, produced in Example 1, to 2-phenyl-amino-5-naphthol-7-sulfonic acid it is coupled to 343 parts of 2-benzoylamino-5-naphthol-7-sulfonic acid dissolved in 5000 parts of water and 1000 parts of soda ash, the isolated dyestuff thus produced dyes cotton a greener shade of blue than that in Example 1. This product is soluble in concentrated sulfuric acid to a deep reddish blue solution. In the form of its free acid it corresponds most probably to the following general formula:

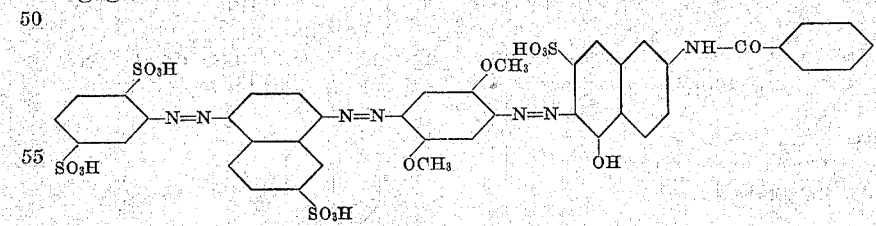

In an analogous manner a great number of other dyestuffs of similar general properties may be prepared by replacing the various components mentioned in Example 1 by their various equivalents as specified at the beginning of this specification. Thus, instead of starting with aniline-disulfonic acid, we may use various other aryl-amine-sulfonic acids, for instance: o-, m-, or p-aniline-sulfonic acids; the halogen-aniline sulfonic acids; the anisidine-sulfonic acids; the xylidine sulfonic acids; the various alpha and beta-naphthylamine-mono- or poly-sulfonic acids; the various amino-naphthol sulfonic acids and the like. Instead of 2,5-dimethoxy-aniline, other dialkoxy anilines such as 2,5-diethoxy-aniline or 2,6-dimethoxy-aniline may be used, provided the position para to the amino group is free.

Instead of coupling first to the dialkoxy-aniline and then to Cleve's acid, we may couple first to Cleve's acid and then rediazotize and couple to the dialkoxy-aniline. We may also use the dialkoxy-aniline as both second and third component, provided the entire molecule contains a sufficient number of $SO_3H$ groups to render the same water-soluble to a satisfactory degree. As Cleve's acid, we may use either the 1,6- or 1,7-naphthylamine sulfonic acid, or a mixture of the two. The amino group in the end component may be free or substituted by various alkyl, aryl, aralkyl or acidyl radicals; such as: methyl, ethyl, phenyl, acetyl, benzoyl, and the like. Moreover, the azole derivatives of J-acid may be used, for instance, phenyl-1,2-naphthimidazole-5-hydroxy-7-sulfonic acid.

Other variations and modifications are possible within the scope of our invention, as will be readily obvious to those skilled in the art.

In the claims below it should be understood that in the claims where new products, dyestuffs, or articles of manufacture are claimed, we mean to include these bodies not only in substance, but also in whatever state they exist when applied to material dyed, printed, or pigmented therewith.

We claim as our invention:

1. The process of preparing azo dyestuffs which comprises diazotizing an aryl-amine of the benzene or naphthalene series, coupling to a component of the group consisting of dialkoxy-aniline having a free para position and Cleve's acid, rediazotizing, coupling to the second member of said group or again to dialkoxy-aniline, rediazotizing and coupling to a 2-amino-5-naphthol-7-sulfonic acid compound.

2. The process of preparing azo dyestuffs, which comprises diazotizing an aryl-amine of the benzene or naphthalene series, coupling to a dialkoxy-aniline, rediazotizing and coupling to a dialkoxy-aniline, rediazotizing and coupling to a 2-amino-5-naphthol-7-sulfonic acid compound.

3. The process of preparing azo dyestuffs, which comprises diazotizing an aryl-amine of the benzene or naphthalene series, coupling to a dialkoxy-aniline, rediazotizing and coupling to a Cleve's acid, rediazotizing and coupling to a 2-amino-5-naphthol-7-sulfonic acid compound.

4. The process of preparing azo dyestuffs, which comprises diazotizing an aryl-amine of the benzene or naphthalene series, coupling to a Cleve's acid, rediazotizing and coupling to a dialkoxy-aniline, rediazotizing and coupling to a 2-amino-5-naphthol-7-sulfonic acid compound.

5. In the process of preparing an azo dyestuff, the step which comprises diazotizing a compound of the following probable general formula:

$$R_1-N=N-R_2-N=N-R_3-NH_2$$

in which $R_1$ is an aryl radical of the benzene or naphthalene series which may be further substituted by substituents of the group consisting of alkyl, halogen, hydroxy, alkoxy, and sulfonic acid and in which one of the members $R_2$ and $R_3$ is a dialkoxy-benzene radical while the other is a naphthalene sulfonic acid radical or in which both $R_2$ and $R_3$ are dialkoxy-benzene radicals, and coupling to a compound selected from the group comprising 2-amino-5-naphthol-7-sulfonic acid and its N-alkyl, aryl, aralkyl, acidyl or azole derivatives.

6. In the process of preparing an azo dyestuff, the step which comprises diazotizing a compound of the following probable general formula:

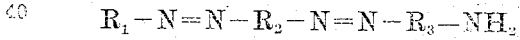

in which $R_1$ is an aryl radical of the benzene or naphthalene series which may be further substituted by substituents of the group consisting of alkyl, halogen, hydroxy, alkoxy, and sulfonic acid, and coupling to a compound having in the form of its free acid the following probable general formula:

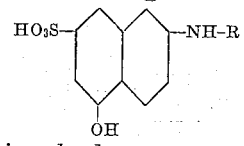

in which R is a hydrogen atom or an alkyl, aryl, aralkyl, or acidyl radical.

7. In the process of preparing an azo dyestuff, the step which comprises diazotizing a compound of the following probable general formula:

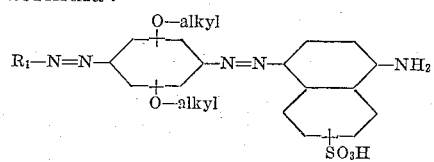

in which $R_1$ is an aryl radical of the benzene or naphthalene series which may be further substituted by substituents of the group consisting of alkyl, halogen, hydroxy, alkoxy, and sulfonic acid, and coupling to a compound having in the form of its free acid the following probable general formula:

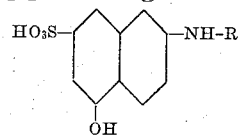

in which R is a hydrogen atom or an alkyl, aryl, aralkyl, or acidyl radical.

8. In the process of preparing an azo dyestuff, the step which comprises diazotizing a compound of the following probable general formula:

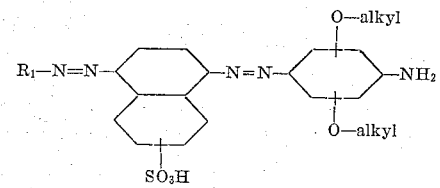

in which $R_1$ is an aryl radical of the benzene or naphthalene series which may be further substituted by substituents of the group consisting of alkyl, halogen, hydroxy, alkoxy, and sulfonic acid, and coupling to a compound having in the form of its free acid the following probable general formula:

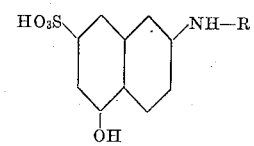

in which R is a hydrogen atom or an alkyl, aryl, aralkyl, or acidyl radical.

9. As new products of manufacture, dyestuffs having in the form of their free acid the following general formula:

$$R_1-N=N-R_2-N=N-R_3-N=N-R_4$$

wherein $R_1$ is an aryl radical of the benzene or naphthalene series which may be further substituted by substituents of the group consisting of alkyl, halogen, hydroxy, alkoxy, and sulfonic acid; wherein one of the members $R_2$ and $R_3$ is a dialkoxy-benzene radical while the other is a naphthalene sulfonic acid radical or wherein both $R_2$ and $R_3$ are dialkoxy-benzene radicals; and wherein $R_4$ stands for the radical of a 2-amino-5-naphthol-7-sulfonic acid compound, said dyestuffs being soluble in sulfuric acid with greenish blue to reddish blue colors, and dyeing cotton directly in blue shades.

10. As new products of manufacture, dyestuffs having in the form of their free acid the following general formula:

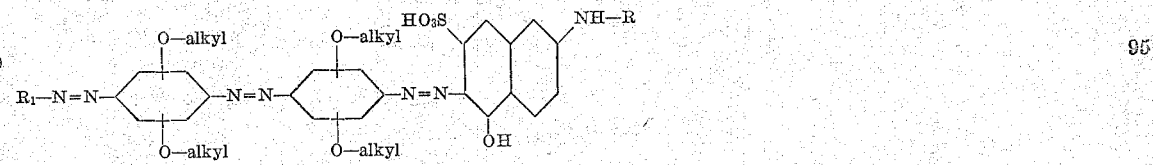

wherein $R_1$ is an aryl radical of the benzene or naphthalene series which may be further substituted by substituents of the group consisting of alkyl, halogen, hydroxy, alkoxy, and sulfonic acid and R represents hydrogen or an alkyl, aryl, aralkyl, or acidyl radical.

11. As new products of manufacture, dyestuffs having in the form of their free acid the following general formula:

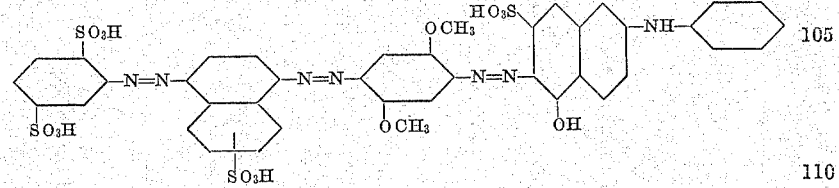

wherein $R_1$ is an aryl radical of the benzene or naphthalene series which may be further substituted by substituents of the group consisting of alkyl, halogen, hydroxy, alkoxy, and sulfonic acid and R represents hydrogen or an alkyl, aryl, aralkyl, or acidyl radical.

12. As new products of manufacture, dyestuffs having in the form of their free acid the following general formula:

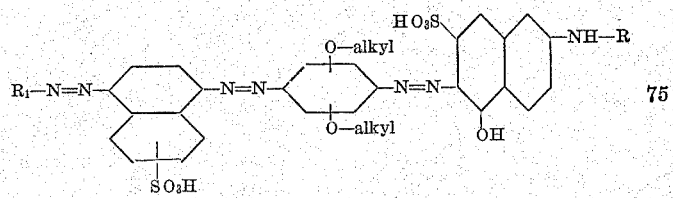

wherein $R_1$ is an aryl radical of the benzene or naphthalene series which may be further substituted by substituents of the group consisting of alkyl, halogen, hydroxy, alkoxy, and sulfonic acid and R represents hydrogen or an alkyl, aryl, aralkyl, or acidyl radical.

13. The process of preparing an azo dyestuff which comprises diazotizing aniline-2,5-disulfonic acid, coupling to Cleve's acid, rediazotizing and coupling to 2,5-dimethoxy-aniline, rediazotizing and coupling to 2-phenylamino-5-naphthol-7-sulfonic acid.

14. As a new product of manufacture, a dyestuff having in the form of its free acid the following formula:

said dyestuff being soluble in concentrated sulfuric acid with a deep navy blue color, and dyeing cotton directly in greenish blue shades.

In testimony whereof, we have hereunto subscribed our names at Carrollville, in the county of Milwaukee, in the State of Wisconsin.

IVAN GUBELMANN.
ARTHUR R. MURPHY.